May 2, 1933.  W. F. STREHLOW  1,906,431
IMPLEMENT ATTACHMENT FOR TRACTORS
Filed Nov. 24, 1930   4 Sheets-Sheet 1

May 2, 1933.  W. F. STREHLOW  1,906,431
IMPLEMENT ATTACHMENT FOR TRACTORS
Filed Nov. 24, 1930    4 Sheets-Sheet 4
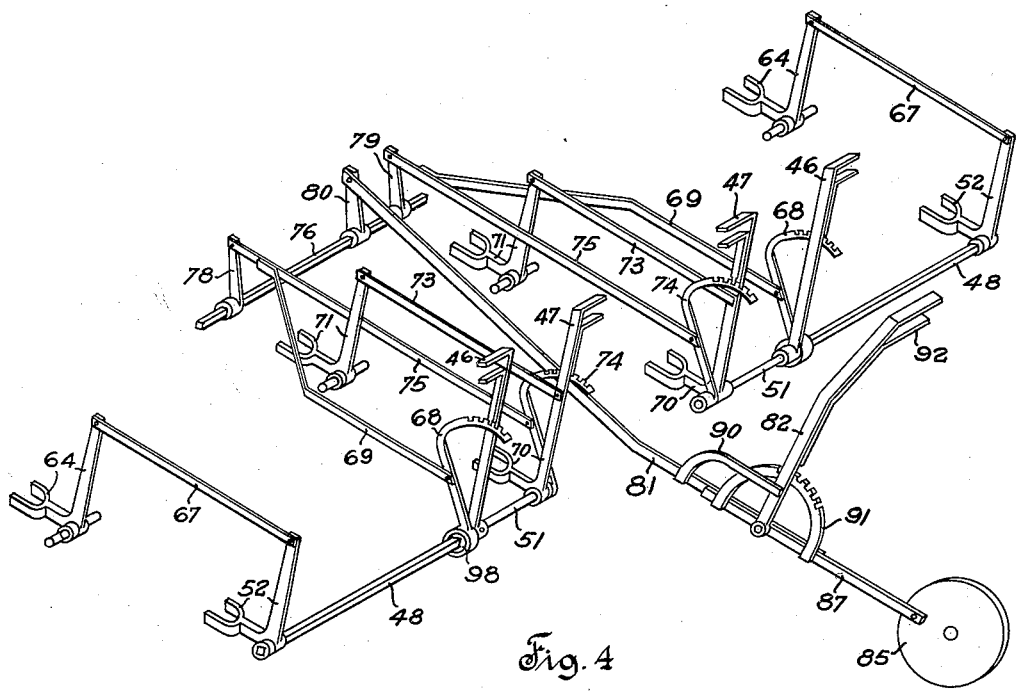
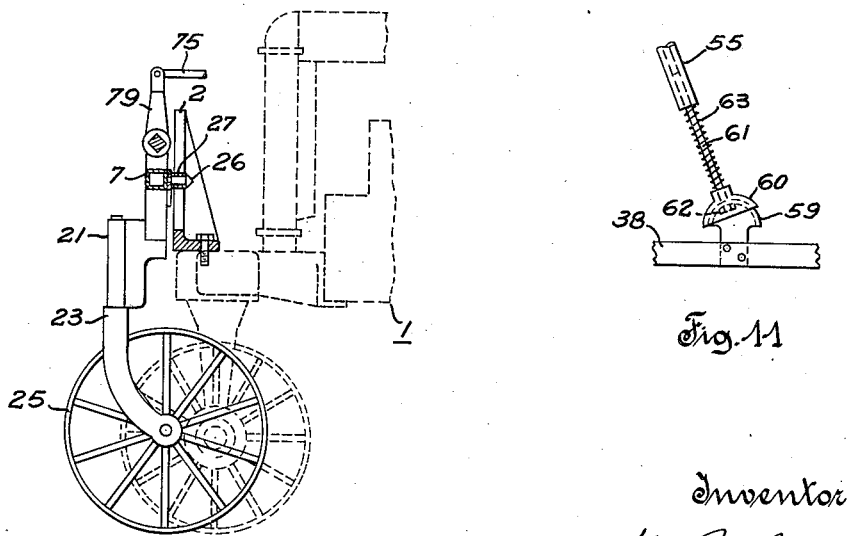

Patented May 2, 1933

1,906,431

UNITED STATES PATENT OFFICE

WALTER F. STREHLOW, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

IMPLEMENT ATTACHMENT FOR TRACTORS

Application filed November 24, 1930. Serial No. 497,853.

This invention relates to improvements in soil working implement attachments for tractors and to the manner in which such devices are mounted on and related to the tractor.

In an application for Letters Patent of the United States, Serial No. 497,852, filed by the present inventor on November 24, 1930, an attachment for tractors has been disclosed which permits implements of various types to be associated with the tractor at one or both sides thereof, and which, in particular, is so constructed that it can be readily connected to and disconnected from the tractor. The present invention aims to accomplish the same object by means which, in some respects, are similar to those disclosed in said application but will allow the front end of the tractor to be relieved from the load of the implement frame. An attachment embodying this feature will be better adapted to carry a great number of earth working tools than the attachment disclosed in said application, while the principal advantages of the latter will be obtainable just as well.

Another object of the invention is to provide an implement attachment of more than two rows for tractors, which is simple and compact in construction and efficient in operation.

A more specific object of the invention is to provide a four row implement which can be easily attached to a tractor with the earth working tools located at the sides thereof, which will be capable of standing on the ground as a self supporting unit, and whose position relative to the ground will remain substantially unchanged while it is being attached to or detached from the tractor.

A further object of the invention is to drive a tractor into and out of an attachment while the latter stands on the ground as a self-supported unit, the attachment including a wheeled support and forward and rearward portions for engagement with forward and rearward portions, respectively, of the tractor.

A further object of the invention is to sustain an attachment frame partly on a wheeled support and partly on other supporting means preferably including implements connected to said frame, so that the frame when thus sustained may occupy substantially the same elevated position above the ground which it occupies when attached to a tractor.

Another object of the invention is to provide an attachment frame partly supported on wheels and connectable with and disconnectable from a tractor by driving the latter into it or out of it, and to arrange implements on said frame in such a manner that they may be moved out of their normal position where they are in the way of the tractor, into a position where they are not in the way of the tractor but where they are still connected with said frame.

Another object of the invention is to provide in an implement attachment for tractors improved mechanism for adjusting individual sets of implements.

These and other objects and advantages of the invention will be apparent from the following description. A clear conception of an embodiment of the invention and of the operation of a device constructed in accordance therewith, may be had by referring to the drawings accompanying and forming a part of this specification, in which like reference characters designate the same or similar parts in the several views.

Fig. 4 is a schematic, perspective view of the mechanism for raising and lowering the earth working tools.

Fig. 5 is a detail of the hand operating mechanism for adjusting sets of earth working tools individually.

Fig. 6 is a side view of the mechanism shown in Fig. 5.

Fig. 7 is a section on line VII—VII in Fig. 5.

Figs. 8 and 9 are detail views of a lever system for adjusting all earth working tools collectively.

Fig. 10 is a section through the front end of the implement, taken on line X—X of Fig. 3.

Fig. 11 is a detail view of a yielding connection between parts of the implement.

Figure 1:
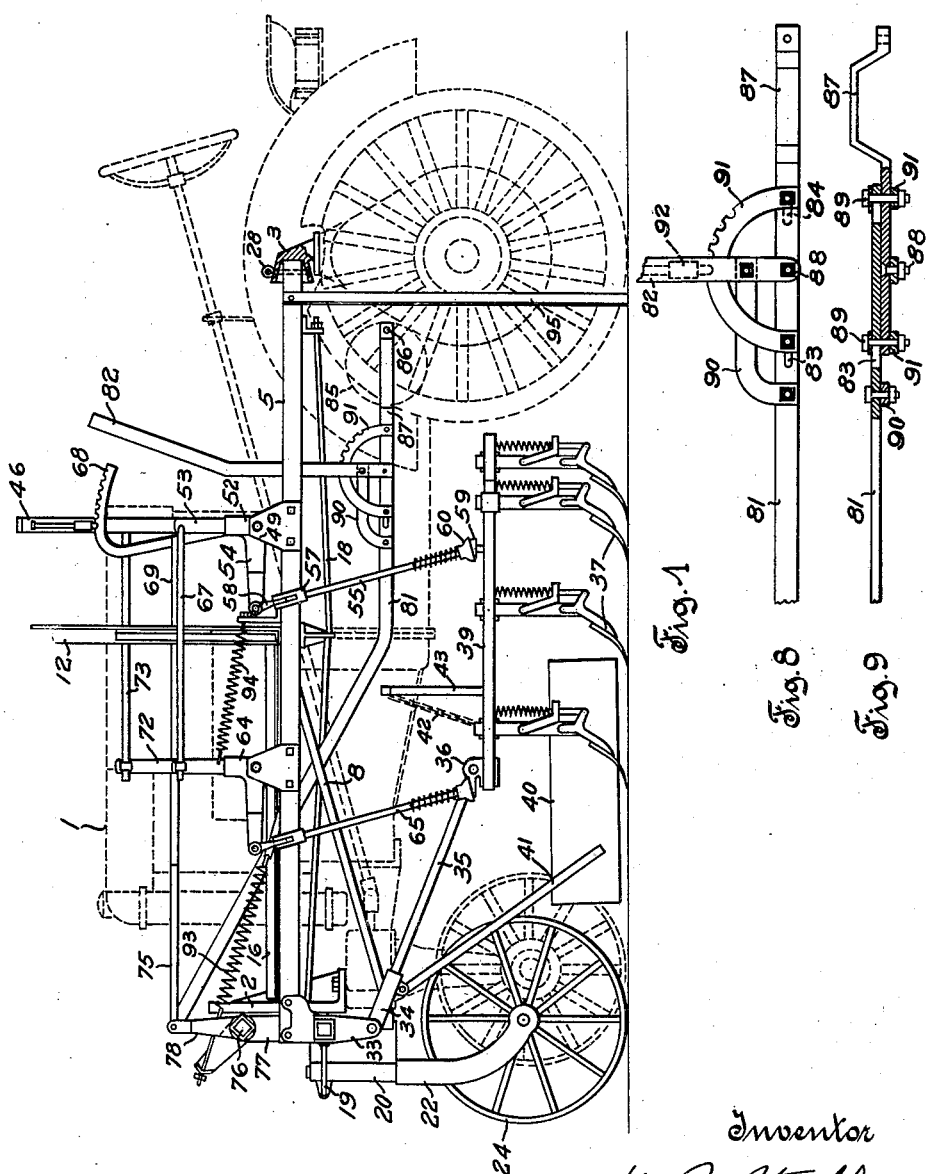
Fig. 1 is a side elevation of a four row cultivator implement attached to a tractor which is shown in dotted lines.
Figure 2:
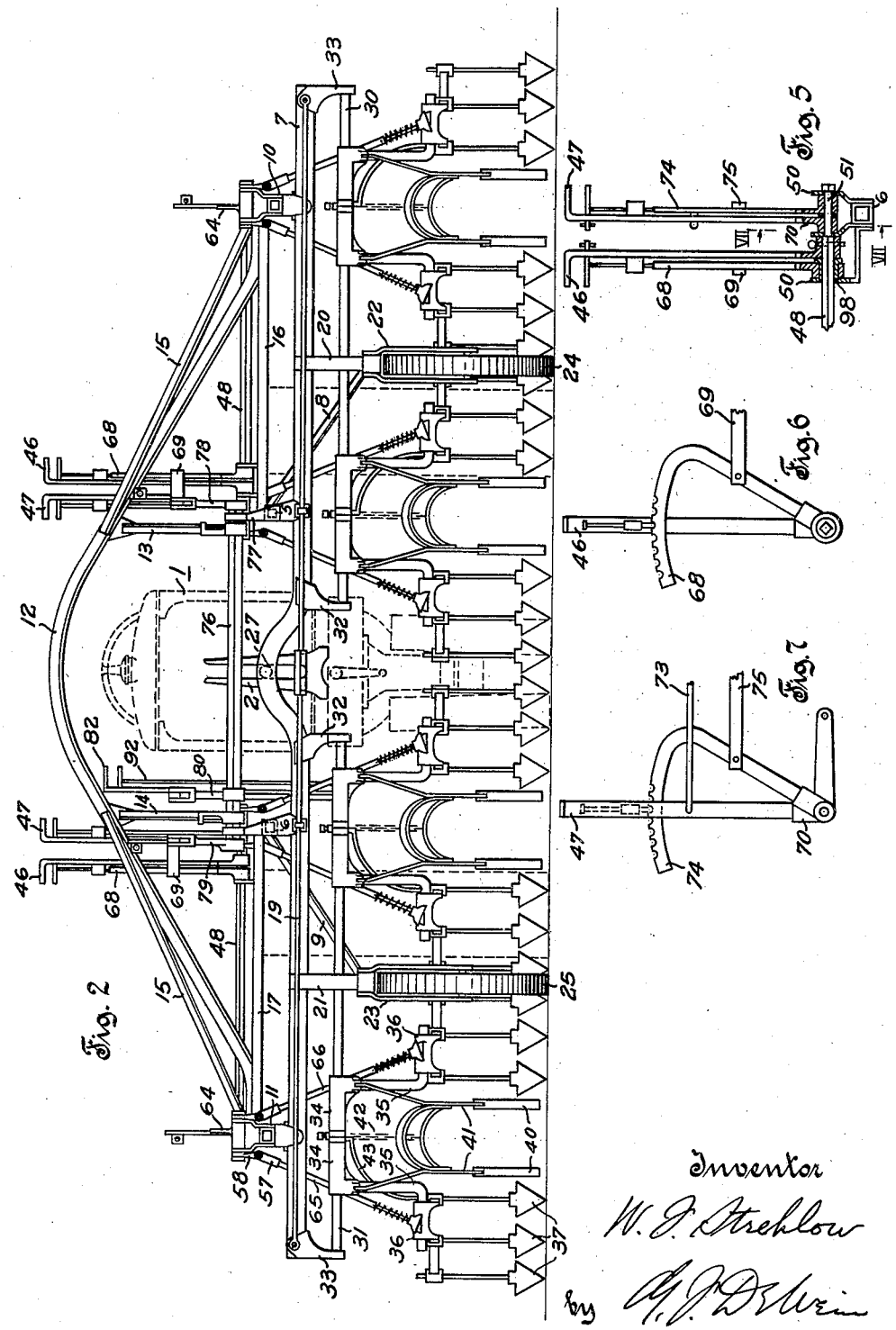
Fig. 2 is a front elevation of the four row cultivator implement shown in Fig. 1.

The numeral 1 indicates, generally, the tractor to which the implement is to be attached and which may be of any suitable design. In the present instance a tractor has been shown embodying certain novel features which are not directly related with the present invention but are more fully disclosed in another application of the same inventor, filed contemporaneously herewith. The tractor is equipped at its forward end with a bracket 2 having a central vertical slot, as best shown in Fig. 2. The bracket is bolted to a forwardly extending portion of the tractor, in the present instance to the upper portion of the front wheel steering truck which is rigidly secured to the main body of the tractor. At the rear end of the tractor two bell-shaped guides 3 and 4 are mounted on the gear cases which house the final drive gears for the rear traction wheels. The bell-shaped guides cooperate with the rear ends of inner frame bars 5 and 6, respectively, which are connected at their front ends to a main cross bar 7 of the implement frame. Rearwardly extending from outer portions of the main cross bar 7 are outer frame bars 10 and 11 which at their rearward portions are connected to an arched brace 12 disposed in a vertical plane about half way between the ends of the lateral frame bars 5 and 6. The arched brace is connected to the frame bars 5 and 6 by posts 13 and 14, respectively, and stiffened by trusses 15 disposed in the plane of the arch. Connected to outer portions of the arched brace 12 are forwardly and inwardly extending bars 16 and 17 whose forward ends are fastened on forward portions of the frame bars 5 and 6, respectively. The main cross bar 7 and the inner frame bars 5 and 6 as well as the outer frame bars 10 and 11 are preferably made of square steel tubing and, in order to increase the strength of the main cross bar and the lateral frame bars, tension rods are associated with these bars, the tension rods 18 on the lateral frame bars being disposed in vertical planes while the tension rod 19 associated with the main cross bar is disposed in a horizontal plane. Fastened to the main cross bar at points about half way between its middle and its ends are brackets 20 and 21 in which supporting forks 22 and 23 for caster wheels 24 and 25 are journaled. The caster wheels are provided to support the front portion of the frame comprising the main cross bar, the inner frame bars 5, 6, the outer frame bars 10, 11 and the arched brace 12, in an elevated position independently of the tractor while the rear end of said frame, that is the rear ends of the frame bars 5, 6, are held in elevated position either by the bell-shaped guides 3, 4 on the tractor, or—if the implement is not attached to the tractor—by supporting rods 95 and 96, swingably connected to rearward portions of the frame bars 5 and 6, respectively. The front end of the frame is guided in the slotted bracket 2 (Fig. 10) which is mounted at the front end of the tractor, by means of a pin 26 rearwardly projecting from the middle portion of the main cross bar 7. The pin has a conical rearward portion to facilitate its entering the slot of the bracket 2, and carries a roller 27 adapted to cooperate with the sides of the slot when the tractor front end moves up and down relative to the main cross bar 7 while the implement is driven over the field. The length of the inner frame bars is preferably such that the main cross bar and the bracket 2 are slightly spaced apart in the direction of the longitudinal tractor axis when the rear ends of said frame bars are fully engaged by the bell-shaped guides, as this is shown in Fig. 1. Pins 28 and 29 inserted into suitable holes of the bell-shaped guides 3 and 4, respectively, and cooperating with corresponding holes in the frame bars 5 and 6 retain the frame bars within the guides. In order to increase the stability of the frame and in order to hold the caster wheel brackets 20 and 21 securely in place stiffening bars 8 and 9 are provided which extend rearwardly and upwardly from these brackets and are connected at their rear ends to the lateral frame bars 5 and 6, respectively, at points well behind the main cross bar.

Figure 3:
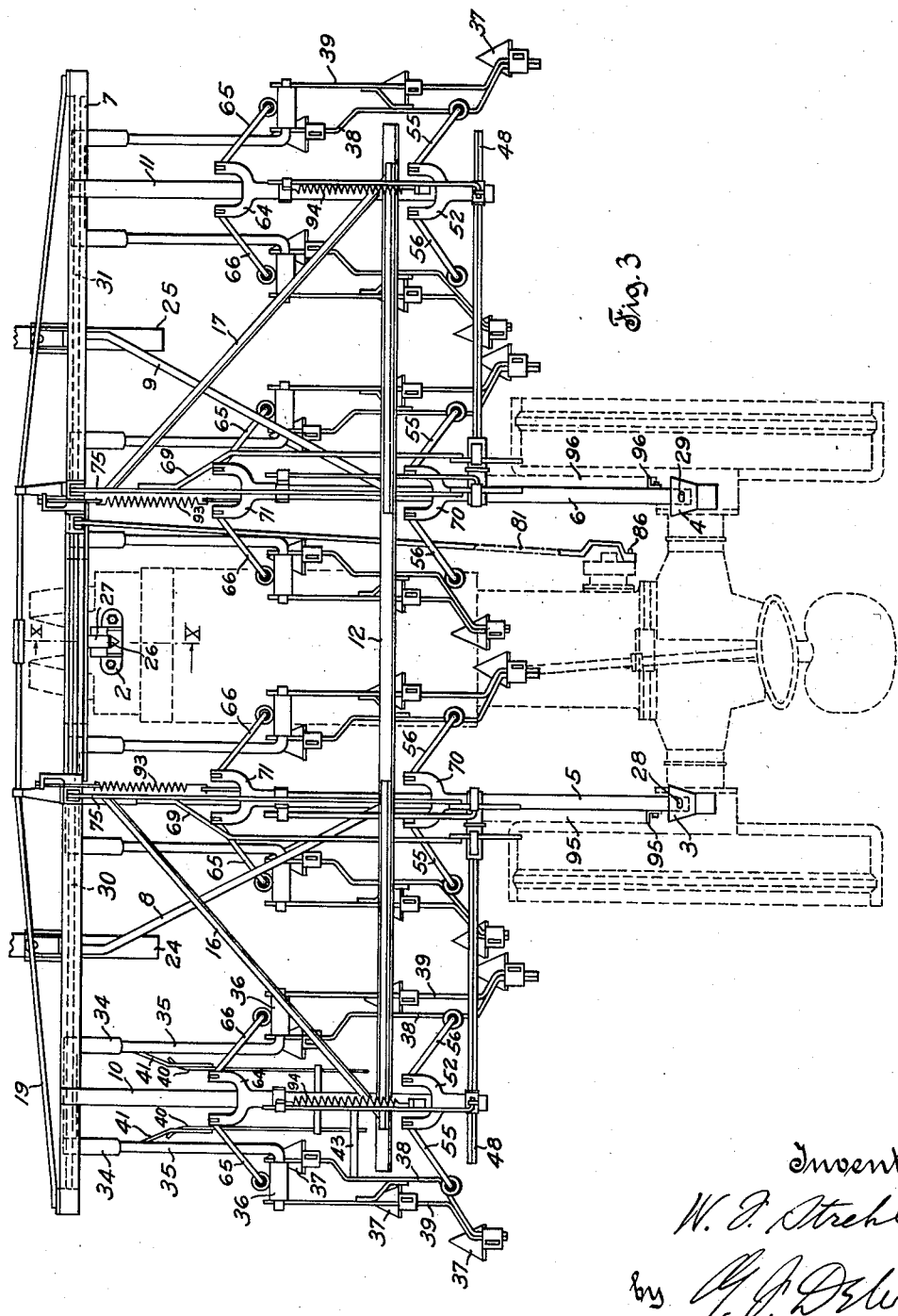
Fig. 3 is a top elevation of the four row cultivator implement shown in Fig. 1.

A pair of alined shafts 30 and 31 is mounted underneath the main cross bar 7 in brackets 32 and 33 fastened to said bar and extending downwardly therefrom. Pivotally mounted on each shaft are two pairs of drag links 34 which are shiftable laterally thereon, and suitable means are provided to hold the links in any desired lateral position but allowing them to swing freely about the shaft axis. Connected to each drag link is a rearwardly and downwardly extending drag beam 35 whose lower end is bent at right angles to the axis of the beam and forms a horizontal journal which carries a sleeve member 36. The earth working tools are associated with the sleeve members 36. In the present instance cultivator shovels 37 have been shown mounted on gang bars 38 and 39 whose forward ends are fastened to the sleeve members 36. A pair of plant guards 40 is swingably connected to each pair of drag links 34 by means of rearwardly extending suspension rods 41, and each pair of plant guards is supported at its rear end by a chain 42 depending from a suitable bracket 43 secured to the respective gang bar 38. The plant guards are shown in Fig. 3 on the extreme left pair of drag beams only and are omitted, for clearness' sake, at the other pairs of drag beams in this figure. They are removable and not used when the implement is driven over fields where the plants have grown up to such size that they do not require particular protection.

Each pair of drag beams and its associated earth working tools are arranged to straddle a row of plants and will, from now on, be referred to as a "tool unit", of which in the present instance, four are shown, viz: two outer tool units and two inner tool units. Mounted on the implement frame is a mechanism whereby each tool unit may be raised or lowered independently, and whereby all tool units may be raised or lowered collectively when the implement is attached to a tractor. The outer tool units are operated by hand levers 46 and the inner tool units by hand levers 47, one pair of hand levers 46 and 47 being mounted on the implement frame at each side of the tractor. Each pair of hand levers is mounted on the inner end of a cross shaft 48 which is journaled in outer bearings 49 (Fig. 1) fastened to the rear end of the respective outer frame bar 10 or 11, and in inner bearings 50 (Fig. 5) fastened to the respective lateral frame bar 5 or 6. Each of the shafts consists of a steel bar having a square cross-section throughout, except at its inner end (Figs. 4 and 5) where a cylindrical journal 51 is formed. The hand lever 46 is securely mounted on the square portion of the shaft 48 adjacent to the cylindrical portion 51, and on the outer end of the square shaft portion a bell crank lever 52 is secured having an upwardly extending arm 53 (Fig. 1), and a forwardly extending, bifurcated arm 54. The forward ends of the bifurcated arm 54 cooperate with rear connecting rods 55 and 56 extending upwardly from rearward portions of the gang bars 38 of the respective outer tool unit which is to be operated by the hand lever 46. Secured to the upper end of each rear connecting rod is a rod end 57 carrying a pin on which a short link 58 is pivoted. The upper end of the link 58 is detachably connected to the corresponding arm 54 of the bell crank lever 52 by means of a cross pin inserted into the forward end of said arm. The pin in the rod end and the pin in the corresponding arm of the bell crank lever are disposed at right angles relative to each other, and it will be apparent that the described arrangement provides a universal joint connection between the connecting rods and the arms of the bell crank lever to which they are attached. Another universal joint connection which, however, is of different design, is provided between the lower end of each connecting rod and the gang bar to which it is attached. This joint is of the ball and socket type and more clearly shown in Fig. 11. A hollow ball element 59 is secured to the gang bar 38, and a socket element 60 is fastened to a bar 61 projecting downwardly from the lower end of the connecting rod and slidably mounted therein. The lower end of the bar 61 projects into the interior of the ball element through a suitable opening and carries a nut 62 which prevents the bar from being pulled out of the ball element. A compression spring 63 extending between the socket element and the lower end of the connecting rod is placed around the free portion of the bar 61.

A bell crank lever 64, which is similar in design and purpose to the bell crank lever 52, is pivotally mounted on each of the outer frame bars 10 and 11, ahead of the bell crank lever 52. Front connecting rods 65 and 66, corresponding to the rear connecting rods 55 and 56, extend between the bifurcated arm of the bell crank lever 64 and the sleeve members 36 carried by the two drag beams 35 of each outer tool unit. The upwardly extending arm of the bell crank lever 64 is connected to the upwardly extending arm 53 of the bell crank lever 52 by a tie rod 67, and it will be apparent from Fig. 4 that by rotating the shaft 48 at one side of the implement or the other the bell crank levers 52 and 64 at the respective side will be moved in unison and the gang bars of the respective outer tool unit will be lifted or lowered, depending on the direction in which the shaft 48 is rotated. The hand lever 46 whereby such rotation may be effected cooperates with a quadrant 68 which is pivotally mounted on a bushing 98 embracing the square portion of shaft 48 near its inner end. The quadrant is held in an upright position by a link 69 whose function will be described later.

The hand levers 47 are connected with the earth working tools of the two inner tool units by means which are similar to those employed for operating the outer tool units. Each of the shafts 48 carries on its cylindrical journal pivotally mounted a bell crank lever 70 which is similar to the bell crank lever 52 on the outer frame bar 10 or 11. The vertical arm of the bell crank lever 70 is directly connected to the hand lever 47 while the bifurcated horizontal arm is connected to the gang bars of the respective inner tool unit by connecting rods 55, 56 in the same manner as has been described in connection with the bell crank levers 52. Ahead of the bell crank lever 70 another bell crank lever 71 is pivotally mounted on each of the inner frame bars 5 and 6, these latter bell crank levers corresponding substantially to the bell crank levers 64 on the frame bars 10 and 11. Their forward arms are connected to the sleeve members 36 of the respective inner tool units by front connecting rods 65 and 66 whose design and function is the same as in the case of the outer tool units. Connected to the vertical arm of each bell crank lever 71 is an extension 72 which is tied to the hand lever 47 by a tie rod 73, and it will be seen that by adjusting the hand lever 47 at one side of the implement or the other the bell crank levers 70 and 71 at the respective side will be moved in unison and the gang bars of the respective inner tool unit will be lifted or lowered, depending on whether the hand lever is moved backwardly or forwardly. Each hand lever 47 cooperates with a quadrant 74 which is pivotally mounted on the cylindrical journal of the respective shaft 48 and held in an upright position by a link 75 which forms part of the mechanism for adjusting all tool units—in other words all earth working tools—collectively. This mechanism will now be described.

A cross shaft 76 extending transversely in the front part of the implement is rotatably mounted in bearings 77 which are fastened to the main cross bar 7 and extend upwardly therefrom. Securely mounted on the cross shaft 76 and extending upwardly therefrom are levers 78 and 79 each of which is pivotally connected to the forward end of one of the links 75. To the forward portion of each link 75 there is also securely fastened the forward end of the link 69 whose rear end is pivoted to the quadrant 68 cooperating with the hand lever 46 at the respective side of the implement. In addition to the levers 78 and 79 a lever 80 is securely mounted on the shaft 76, and pivotally connected to the end of this lever is a long, rearwardly and downwardly extending link 81 to which power is applied in order to lift or lower the earth working tools collectively. In the present instance the link is acted upon by a hand lever 82 and also by a power-driven element of the tractor, which in the drawings has been indicated as consisting of a rotary disk 85 arranged at one side of the tractor and provided with a laterally projecting pin 86. Pivotally supported by the pin 86 and slidably attached to the rear end of the link 81 is a connecting bar 87 which has a laterally projecting pin 88 (Figs. 8 and 9) on which the hand lever 82 is pivotally mounted. The connecting bar and the rear end of the link 81 are held together by bolts 89 which are securely held in the connecting bar and cooperate with slotted holes 83 and 84 in the link so as to allow relative movement in longitudinal direction between the link and the connecting bar. A hook-shaped link 90 is pivotally connected at its one end to the hand lever 82 and at its other end to the link 81 so that by swinging the hand lever 82 around the pivot 88 the connecting bar 87 and the link 81 are moved relative to each other. A toothed arc 91 securely held on the connecting bar 87 cooperates with a suitable locking device 92 on the hand lever 82 to hold the latter in any adjusted position.

When the disk 85, in Fig. 1 is rotated through an angle of 180° the link 81 will be pushed forwardly and the cross shaft 76 will be rotated in an anti-clockwise direction. This will cause the links 75 and 69 to be pulled forwardly taking with them the quadrants 74 and 68 and also the hand levers 47 and 46. The horizontal arms of all bell crank levers associated with these hand levers will therefore be lowered and all earth working tools brought into the soil. The working depth of the earth working tools may be adjusted collectively by manipulating the hand lever 82, this causing merely a change of the distance between the pin 86 on the disk 85 and the outer end of the lever 80 on the cross shaft 76. By rotating the disk 85 through another angle of 180° the link 81 will be pulled backwardly and this will cause all earth working tools to be lifted out of the soil. The driving mechanism for the disk 85 and the means for effecting intermittent rotation thereof are more fully disclosed in the application which has been mentioned hereinbefore in connection with the tractor. It will be apparent, however, that other means than those disclosed in said application may be used for pushing the connecting bar 87 back and forth.

In order to facilitate the collective raising and lowering of the earth working tools balancing springs 93 are provided which tend to rotate the cross shaft 76, in Fig. 1, in a clockwise direction. Other balancing springs 94 are provided which act upon the bell crank levers 64 and tend to rotate these levers also, in Fig. 1, in a clockwise direction.

A depth adjustment of the earth working tools, independent of the hand lever 82, may be effected by manipulating the hand levers 46 and 47, each of these levers controlling one of the four tool units as this has been described hereinbefore.

It will be seen that the whole implement which has been described so far, forms a unitary structure adapted to stand on the ground without requiring any support from the tractor. The latter may be pulled out of the implement after the following operations have been performed. The supporting rods 95 and 96, which, when the implement is driven over the field, are held by suitable means in an elevated position parallel to the frame bars 5 and 6, are brought into the position shown in Fig. 1, whereby the bell-shaped guides are relieved from the load of the frame rear end. The earth working tools of the two inner working units are lifted from the ground by operating the levers 47, whereupon the drag links 34 of these units are shifted outwardly on the shafts 30 and 31, respectively, in order to move the earth working tools, which are disposed next to the longitudinal center line of the implement, out of the way of the tractor front wheels. The drag links and their associated beams may be shifted conveniently after the front and rear connecting rods 55 and 65 in each of the inner working units have been disconnected from their respective bell crank levers 70 and 71. After disconnecting the connecting bar 87 from the tractor and removing the pins from the bell-shaped guides the tractor may now be driven backwardly out of the implement, while the latter is left standing on the ground in a position which will allow the tractor to be driven in again at any time. It will be noted that the whole implement frame may also be held in the same elevated position without the aid of the rear supporting rods 95 and 96 if the connecting bar 87 is securely attached to the lateral frame bar 6 after the connecting bar has been disconnected from the power lift disk 85. A suitable bracket, not shown in the drawings, is preferably provided for holding the connecting bar securely on the frame bar 6. Under these conditions the link 81 will be prevented from moving backwardly if the shaft 76 develops a tendency to rotate in a clockwise direction (Fig. 1). Such tendency will be caused by the upward push to which the horizontal arms of the bell crank levers 52, 64 and 70, 71 will be subjected when the rearward portion of the implement frame is sustained by the front and rear connecting rods associated with these bell crank levers and the earth working tools.

It should be understood that it is not intended to limit the invention to the exact details of construction herein shown and described, for various modifications within the scope of the claims may occur to persons skilled in the art.

It is claimed and desired to secure by Letters Patent:

1. An implement attachment for tractors, comprising a front cross member and a frame element extending rearwardly therefrom, means for attaching said front cross member to a tractor in laterally fixed relation but permitting vertical movement thereof, means associated with a rearward portion of said frame element for attaching the latter in longitudinally fixed relation to a tractor, a wheeled support associated with said front cross member, and supporting means associated with said rearwardly extending frame element, said wheeled support and said supporting means being arranged so as to hold said front cross member and said rearwardly extending frame element in substantially the same position above the ground which they occupy when attached to the tractor.

2. The combination of a tractor, an implement having a frame including a pair of beams extending rearwardly on each side of said tractor and swingably connected thereto at their rear ends, a wheeled support for said frame so arranged as to sustain the front end thereof in an elevated position independently of said tractor, and means adapted to hold the rearward portions of the frame, which are to be connected to the tractor, independently thereof in substantially the same position above the ground which they occupy when connected to the tractor, said means comprising vertically adjustable earth working tools suspended from said frame, and a mechanism associated with said frame to effect vertical adjustment of said earth working tools.

3. An implement attachment for tractors, comprising a frame having front and rear portions adapted to be engaged respectively by front and rear portions of a tractor, and means adapted to hold said frame in substantially the same position above the ground which it occupies when engaged by the tractor, said means comprising a wheeled support associated with the implement frame, vertically adjustable ground engaging elements adapted to be shifted laterally on said frame, and a mechanism to effect vertical adjustment of said ground engaging elements.

4. The combination with a tractor having a longitudinally extending body supported on front and rear wheels, of means for connecting implements at both sides of the tractor, comprising a cross bar extending transversely to the longitudinal tractor axis, wheeled supports permanently connected to said cross bar, a slotted member mounted on a forward portion of the tractor with the slot in vertical disposition, a guide element projecting rearwardly from a central portion of said cross bar and cooperating with said slot, a rearwardly directed lateral bar connected to said cross bar at each side of the tractor, and means for holding the rear ends of said lateral bars in fixed longitudinal and vertical relation to the tractor.

5. The combination with a tractor having a longitudinally extending body supported on front and rear wheels, of means for connecting implements at both sides of the tractor, comprising a cross bar extending transversely to the longitudinal tractor axis, caster wheel supports permanently connected to said cross bar and positioned on opposite sides of the longitudinal tractor axis, means associated with said cross bar and a forward portion of the tractor and adapted to hold a central portion of the cross bar engaged with the tractor but allowing it to move up and down relative to the tractor, a rearwardly directed lateral bar connected to said cross bar at each side of the tractor, means associated with a rearward portion of the tractor for holding the rear ends of said lateral bars in fixed longitudinal and vertical relation to the tractor, tool supporting means associated with said cross bar and said lateral bars and means including said tool supporting means for holding the rear ends of said lateral bars independently of said rearward means associated with the tractor in substantially the same elevated position above the ground, which said rear ends occupy when attached to the tractor.

6. The combination with a tractor having a longitudinally extending body supported on front and rear wheels, of means for connecting implements at both sides of the tractor, comprising a cross bar extending transversely to the longitudinal tractor axis, wheeled supports permanently connected to said cross bar and positioned on opposite sides of the longitudinal tractor axis, a slotted member mounted on a forward portion of the tractor with the slot in vertical disposition, a guide element projecting rearwardly from a central portion of said cross bar and cooperating with said slot, a rearwardly directed lateral bar connected to said cross bar at each side of the tractor, a bell-shaped element secured to the tractor body at each side with the bell center-line in horizontal disposition, means for retaining the rear ends of said lateral bars within said bell-shaped elements, supporting rods swingably connected to rearward portions of said lateral bars and adapted to rest on the ground so as to hold said rear ends independently of the tractor on the level of said bell-shaped elements.

7. A four row implement attachment for tractors, comprising a frame, vertically rockable bell crank levers mounted on said frame in four laterally spaced pairs, one bell crank lever of each pair being arranged in front of the other, earth working tools associated with each pair of bell crank levers and suspended from said frame so as to be vertically adjustable by rocking the respective pair of bell crank levers, rocking means and locking elements associated therewith, pivotally mounted on said frame for adjusting each pair of bell crank levers individually, and means for rotating all locking elements in unison with their associated rocking means simultaneously so as to lift or lower all earth working tools collectively.

8. A four row implement attachment for tractors, comprising a longitudinally extending frame, vertically rockable bell crank levers mounted on said frame in four laterally spaced pairs, one bell crank lever of each pair being arranged in front of the other, earth working tools associated with each pair of bell crank levers and suspended from said frame so as to be vertically adjustable by rocking the respective pair of bell crank levers, rocking means and locking elements associated therewith, pivotally mounted on said frame for adjusting each pair of bell crank levers individually, a cross shaft rotatably mounted on a front portion of said frame and extending transversely to the longitudinal frame axis, rocking levers mounted securely on said cross shaft and connected to said locking elements, and means for rocking said cross shaft so as to lift or lower all earth working tools collectively.

9. A four row implement attachment for tractors, comprising a pair of longitudinally extending, laterally spaced inner frame bars, a horizontal cross bar connected to the front ends of said inner frame bars and extending laterally therefrom at both sides, a pair of outer frame bars extending rearwardly from the laterally extending portions of said cross bar, means to hold said cross bar and said inner and outer frame bars in relatively fixed position so as to form a rigid frame, a pair of longitudinally spaced bell crank levers mounted on each of said frame bars for rocking movement in a vertical plane, earth working tools associated with each pair of bell crank levers and suspended from said frame so as to be vertically adjustable by rocking the respective pair of bell crank levers, rocking means and locking elements associated therewith, pivotally mounted on said frame for adjusting each pair of bell crank levers individually, and means for rotating all locking elements in unison with their associated rocking means simultaneously so as to lift or lower all earth working tools collectively.

10. An implement attachment for tractors, comprising a cross member extending transversely to the direction of propulsion, means for attaching said cross member to a tractor in laterally and longitudinally fixed relation thereto but permitting vertical movement thereof, tool supporting means associated with said cross member, a mechanism for vertically adjusting said tool supporting means, and means including tools carried by said tool supporting means, for holding said cross member in an elevated position above the ground, independently of the tractor, for ready attachment thereto.

11. An implement attachment for tractors, comprising a cross member extending transversely to the direction of propulsion, a frame element extending rearwardly from said cross member, means for attaching said cross member to a tractor in laterally fixed relation thereto but permitting vertical movement thereof, means associated with a rearward portion of said rearwardly extending frame element for attaching the latter in longitudinally fixed relation to a tractor, and supporting elements laterally and longitudinally spaced apart relative to the direction of propulsion and adapted to hold said cross member and the rearward portion of said frame element in an elevated position above the ground, independent of the tractor, for ready attachment thereto.

12. An implement attachment for tractors comprising a cross member extending transversely to the direction of propulsion, a frame element extending rearwardly from said cross member, means for attaching said cross member to a tractor in laterally fixed relation thereto but permitting vertical movement thereof, means associated with a rearward portion of said rearwardly extending frame element for attaching the latter in longitudinally fixed relation to a tractor, tool supporting means associated with said cross member, a mechanism for vertically adjusting said tool supporting means, and means including tools carried by said tool supporting means for holding said cross member and said frame element in an elevated position above the ground, independend of said tractor, for ready attachment thereto.

In testimony whereof, the signature of the inventor is affixed hereto.

WALTER F. STREHLOW.